United States Patent [19]
Doi

[11] Patent Number: 4,799,835
[45] Date of Patent: Jan. 24, 1989

[54] MACHINE TOOL

[76] Inventor: Katsumi Doi, 13-15, Kujyo 2-chome, Nishi-ku, Osaka, Japan

[21] Appl. No.: 56,408

[22] Filed: May 29, 1987

[51] Int. Cl.⁴ .............................................. B23Q 1/06
[52] U.S. Cl. ................................ 409/219; 269/289 R; 408/87; 408/234; 409/235
[58] Field of Search ..................................... 408/87–89, 408/90, 234; 409/163, 167, 189, 197, 219, 235, 241, 205; 29/26 R, 26 A; 269/289 R, 309, 311

[56] References Cited
U.S. PATENT DOCUMENTS

| | | | |
|---|---|---|---|
| 395,943 | 1/1889 | Batman | 408/89 |
| 2,360,921 | 10/1944 | Wiken | 408/234 |
| 3,577,828 | 5/1971 | Stickney | 408/234 X |

*Primary Examiner*—Gil Weidenfeld
*Assistant Examiner*—Steven C. Bishop
*Attorney, Agent, or Firm*—Wenderoth, Lind & Ponack

[57] ABSTRACT

The present invention is an improvement in a machine tool having a pedestal, a vertical column fixedly mounted on the pedestal, a workhead mounted on the column, an elevating mechanism for elevating the workhead along the column, and a worktable provided the pedestal. The workhead carries a spindle, a motor for driving the spindle, a reduction gear and a longitudinal feed gear. According to the present invention, another worktable is provided at a different height from the first worktable and at a position displaced by at least 90 degrees from the first worktable with respect to the column. This considerably reduces the restrictions on the size of a workpiece which can be worked by the machine tool.

2 Claims, 2 Drawing Sheets

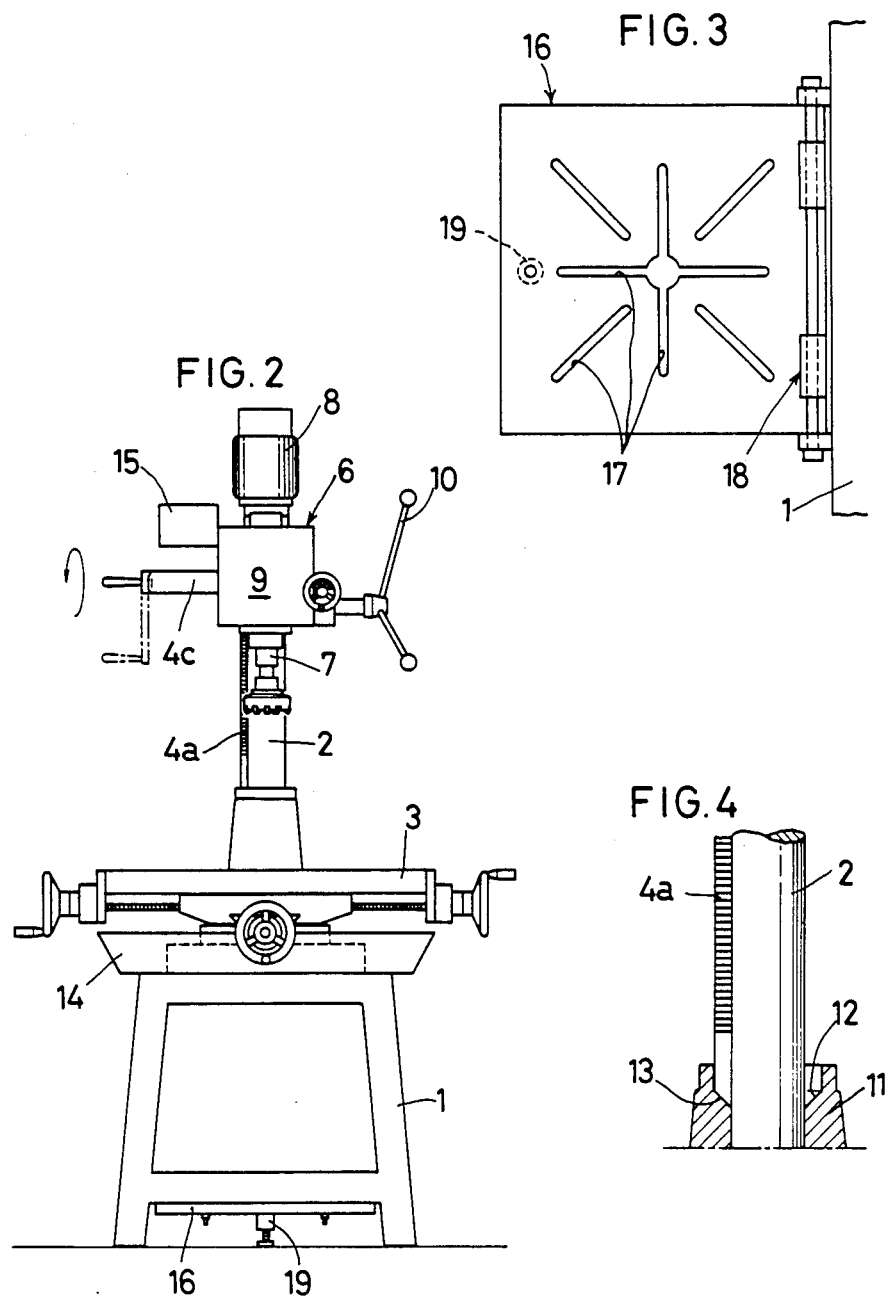

MACHINE TOOL

BACKGROUND OF THE INVENTION

The present invention relates to a machine tool in which there are fewer restrictions on the size of a workpiece that is workable thereon.

Machine tools provided with a spindle, a spindle motor, a redution gear and a longitudinal feed gear in general use include a bench drilling machine. It is also known to mount a workhead having the above-mentioned elements on an upright column so as to be elevatable and movable around the axis of the column. As occasion demands, the machine tool may be provided with an indexing attachment so that the workhead can be moved around an axis perpendicular to the axis of the spindle and/or with a horizontal arm for facilitating horizontal movement of the workhead in order to provide greater freedom in the working position of the workhead.

The trouble is that each of the conventional machine tools of this type has only one worktable with a specific height, resulting in that the size of a workpiece workable thereon is restricted to within comparatively narrow limits. The workpiece workable thereon is limited to a workpiece which can be set between a tip of a tool clamped on the spindle and the worktable with the workhead in its uppermost position.

SUMMARY OF THE INVENTION

It is an object of the present invention to provide a machine tool which obviates the above-described disadvantage.

In accordance with the present invention, another worktable is provided at a different height and a different position from those of a regular worktable to diminish the restrictions on the size of a work. This makes it possible to work a workpiece which is too large to work on the regular worktable, and thus to use the same one machine tool to work workpieces having a wider range of respective sizes.

If there is a difference in the levels at which the first and second worktables are positioned, then a workpiece which is longer than a workpiece workable on the first worktable by said difference can be worked on the second worktable.

With the above-described object in mind and as will become apparent from the following detailed description, the present invention will be more clearly understood in connection with the accompanying drawings.

BRIEF DESCRIPTION OF THE DRAWINGS

FIG. 2 is a front view thereof;

FIG. 3 is a plan view of the second worktable of the present invention; and

FIG. 4 is a sectional view illustrating how the lower end of a rack is received in a support member.

DETAILED DESCRIPTION OF THE INVENTION

Figure 1:
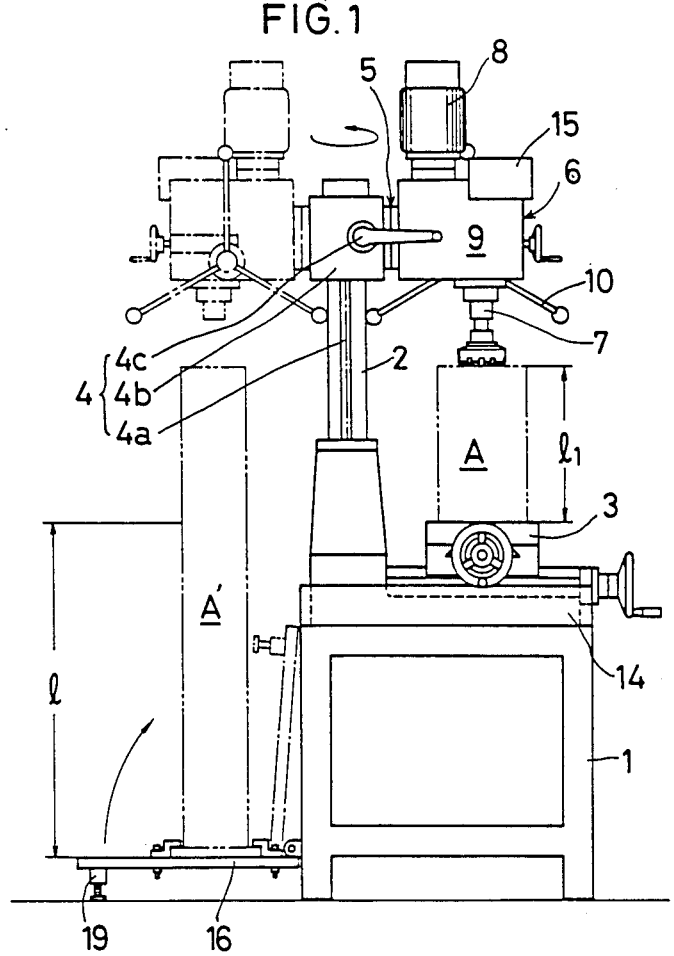
FIG. 1 is a side view of an embodiment of the present invention.

Referring now to FIGS. 1 and 2, the machine tool in accordance with the present invention includes a column 2 and a worktable 3 both mounted on a pedestal 1. With a known feed mechanism with a handle, the worktable 3 can be moved back and forth and from side to side.

Also, mounted on the column 2 are a rack 4a adapted to be movable around the column, a slider 4b having a pinion (not shown) threadedly engaging the rack 4a, and a handle 4c for imparting torque to the pinion. These members comprise a known elevating mechanism 4. A workhead 6 is coupled through an indexing unit 5 to the slider 4b which is moved up and down, guided by the column 2.

The workhead 6 carries a spindle 7, a spindle motor 8, a reduction gear and a longitudinal feed gear for the spindle, the last two components being accommodated in a gear box 9. Since the reduction gear and the longitudinal feed gear are of a well known type, they are not shown and only a handle 10 for the longitudinal feed of the spindle is shown in FIGS. 1 and 2. The indexing attachment 5 is also of a well known type and is used to allow the workhead 6 to turn round an axis perpendicular to the axis of the column 2.

As shown in FIG. 4, the tapered lower end of the rack 4a is loosely inserted into an annular groove 12 defined between the column 2 and a support member 11 so as to permit the rack 4a to be moved around the cylindrical surface of the column 2. The load applied by the slider 4b to the bottom 13 of the groove 12 may be divided into two component forces, one of which acts on the bottom 13 and serves to keep the rack 4a in close contact with the column 2.

Chips and cutting oil are received by a pan 14. A control box 15 is attached to the gear box 9.

A second worktable 16 is spaced from the first worktable 3 by 180 degrees with respect to the axis of the column 2. A workpiece can be held on the worktable 16 by means of clamps and clamping bolts, the latter of which extend through slits 17 (FIG. 3). The worktable 16 is coupled to the pedestal 1 by means of hinges 18 secured to one side of the worktable 16. When not in use, the worktable 16 is swung up to the position shown with chain lines in FIG. 1. When in use, the worktable 16 can be adjusted to a suitable height by means of a threaded leg 19 screwed into the underside of the worktable 16 near the free end thereof.

Preferably, the worktable 16 should be adapted to be secured to the above-described swung-up position by means of a latch. The second worktable 16 may be spaced from the first worktable 3 by 90 degrees.

As is the case with the first worktable 3, the second worktable 16 may also be provided with feed gears for feeding a workpiece back and forth and from side to side. Alternatively, the second worktable 16 may be a turntable.

When the workhead 6 is placed in the position shown with solid lines in FIG. 1, a workpiece A having a height not exceeding $l_1$ can be worked on the first worktable 3. As an advantage offered by the present invention, a workpiece A' as long as $l_1+l$ can be worked on the second worktable 16 when the workhead 6 is allowed to swing horizontally by 180 degrees around the axis of the column 2 until it comes to the position shown with chain lines in FIG. 1. The larger the difference $l$ in height between the first worktable 3 and the second worktable 16, the less restrictions there are on the size of the workpiece that can be worked by the present invention.

What is claimed is:

1. In a machine tool having a pedestal for supporting the machine tool on a supporting surface, a column fixedly mounted on the pedestal and extending in a vertical direction, a workhead movably mounted to the column so as to be movable up and down along the column and around the column, an elevating means for moving the workhead up and down along the column, and a first worktable disposed on the pedestal below the workhead for supporting a workpiece, the workhead including a spindle, a motor for driving the spindle, a reduction gear and a longitudinal feed gear, the improvement comprising:

a second worktable hinged to the pedestal for supporting a workpiece, said second worktable pivotable between a work position at which said second worktable is disposed below the first worktable and extends adjacent said supporting surface and a stowed position at which said second worktable is disposed against the pedestal and is away from the supporting surface, feed means for moving a worktable operatively connected thereto in at least one direction extending perpendicular to said vertical direction; and of said first and said second worktables, only said first worktable having said feed means operatively connected thereto.

2. An improvement in a machine tool as claimed in claim 1, wherein said second worktable is hinged to a part of said pedestal at a location displaced by 180 degrees from said first worktable with respect to said column.

* * * * *